Nov. 12, 1968 M. F. SLANA 3,410,961

LINE CIRCUIT FOR A TELEPHONE SYSTEM HAVING OPTICAL SOLID STATE MEANS

Filed Oct. 12, 1965 3 Sheets-Sheet 1

INVENTOR
M. F. SLANA
BY
M l Rackman
ATTORNEY

United States Patent Office 3,410,961
Patented Nov. 12, 1968

3,410,961

LINE CIRCUIT FOR A TELEPHONE SYSTEM HAVING OPTICAL SOLID STATE MEANS

Matthew F. Slana, Millington, N.J., assignor to Bell Telephone Laboratories, Incorporated, New York, N.Y., a corporation of New York Filed Oct. 12, 1965, Ser. No. 495,155
11 Claims. (Cl. 179—18)

ABSTRACT OF THE DISCLOSURE

A line circuit is disclosed in which a two way optical coupling permits signals to be transmitted between a telephone line and a switching network with isolation but without the use of a transformer. The coupling between the line and network path comprises light emitting devices in one path and light responsive devices in the other path for each direction of transmission.

This invention relates to telephone switching systems and more particularly to line circuits for use therein.

In conventional telephone systems a line circuit is provided for connecting each subscriber line to the switching network. The line circuit serves in a variety of capacities. It is often the mechanism for notifying a system control unit of service requests and other supervisory signals. It is through the line circuit that various signals such as ringing current and ringback and busy tones are extended to the subscriber line. One of the most important functions of the line circuit is to couple the line to the switching network in order that signal currents be extended between the respective subscriber and the switching network.

An all-solid-state line circuit would be highly advantageous for many reasons. Among these is the reduced size which would be possible. In the present technology however almost all line circuits include a transformer, the transformer not only being bulky but in addition preventing the line circuit from being fabricated by the use of integrated circuit techniques. The transformer in a conventional line circuit is required for isolation purposes. Very often the DC current levels in the line and switching network are different and the use of a transformer allows AC coupling even though the DC currents are different. Furthermore, the use of a transformer enables longitudinal noise cancellation; undesired longitudinal signals appearing in the line are not transmitted to the switching network if the two ends of the line are connected to opposite sides of one of the transformer windings.

It is a general object of this invention to provide a compact all-solid-state line circuit having improved characteristics without the use of a transformer.

Two illustrative embodiments of my invention utilize a photon-coupled semiconductor device which has been called among other names, an opto-electronic amplifier. In its simplest form the unit consists of a gallium arsenide diode which emits light when current passes through it. The stream of photons emitted is proportional to the magnitude of the current through the diode. The photons are optically coupled to a photo-transistor, the current through which varies not only in accordance with the magnitude of the base potential but in addition in accordance with the intensity of the impinging light which strikes the base region. The transistor current is thus proportional to the diode current.

In the first illustrative embodiment of my invention the diodes of two of these devices are connected in series with the subscriber line. The two associated photo-transistors are connected in parallel and the current through them is extended to the switching network. A second pair of devices is also provided. The diodes in the second pair are also connected in series and the current through them comes from the switching network. The two associated photo-transistors are connected in series with the subscriber line, the two transistors of the second pair of photon-coupled device thus being in series with the two diodes of the first pair of the devices.

Variations in the line current result in a varying stream of photons being emitted from the diodes in the first pair of devices. Through the optical coupling the two photo-transistors associated with these diodes extend a varying signal current to the switching network. Similarly, variations in the signal received from the switching network control variations in the intensities of the photon streams emitted by the two diodes in the second pair of devices. These varying photon streams control the conduction in the two associated photo-transistors which are in series with the line, and in this manner current signals from the switching network are extended to the subscriber.

It is thus seen that this two-way optical coupling permits signal currents to be extended between the line and the switching network without the use of a transformer. The DC currents in the line and in the switching network path may be different since there is no direct electrical coupling. The arrangement also insures longitudinal noise cancellation. Any longitudinal current in the line causes the photon stream from one of the diodes in the first pair to be increased and the photon stream from the other diode in the pair to be decreased. This has the effect of enabling one of the associated photo-transistors to conduct more heavily and the other to conduct less heavily. The net effect is that no signal is transmitted to the switching network. Voice signals, on the other hand, affect both diodes in the same way and through the optical coupling control a voice signal to be extended to the switching network.

Because the two photo-transistors in the second pair of devices are in series with the two diodes in the first pair of devices "singing" may occur. A signal from the switching network causes the line current to vary. Because this current variation affects the intensity of the photon streams emitted by the two diodes in the first pair the received signal may be transmitted back to the switching network. To prevent this singing effect a differential amplifier is provided in the line circuit. This amplifier is used to remove incoming signals to the line circuit from the outgoing signals originating in the line. In addition to the differential amplifier a DC feedback network is provided to insure the proper operating levels.

One of the advantages of the arrangement (in addition to the fact that a transformer is not necessary) is that supervisory signals may be derived in the line circuit as a function of the conduction of the two photo-transistors in the second pair which are connected to the switching network. Due to the optical coupling the conduction of these transistors is dependent upon the magnitude of the line current and a line scanner may be connected directly to them rather than to the line itself. By scanning the transistors in that portion of the line circuit connected to the switching network rather than to the line itself the operation of the scanner is made independent of the length of the line and other factors such as leakage resistance.

The second illustrative embodiment of my invention is similar to the first except that the subscriber line is four-wire rather than two-wire. This enables two-way optical coupling in such a manner that singing cannot occur, and consequently there is no need for the differential amplifier.

It is a feature of this invention to use photon-coupled devices in a line circuit for coupling to each other a subscriber line and the switching network of a telephone system.

It is another feature of this invention to optically couple the line side of the line circuit to the switching network side of the line circuit in such a manner that longitudinal currents in the line affect the light intensities of two light emitting diodes in opposite manners so that no signal current is extended to the switching network.

It is another feature of this invention to determine the supervisory status of an optically-coupled line circuit by scanning the switching network side of the line circuit.

It is another feature of this invention, in one illustrative embodiment thereof, to prevent "singing" with the use of a differential amplifier.

Further objects, features and advantages of my invention will become apparent from consideration of the following detailed description in conjunction with the drawing in which.

Figure 1:
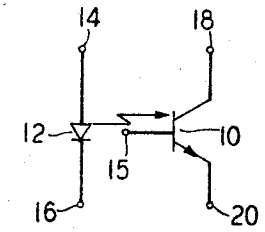
FIG. 1 is a schematic drawing of a photon-coupled device.

In the photon-coupled device of FIG. 1 in the absence of a control current between terminals 14 and 16 no signal current can flow between terminals 18 and 20 unless photo-transistor 10 is forward-biased with the application of a potential to terminal 15 which is greater in magnitude than the potential at terminal 20. When control current flows through gallium arsenide diode 12 the diode emits photons which impinge on the base region of the photo-transistor. The photo-transistor conducts even if the base-emitter junction is not forward-biased by an external source. In general, the signal current which flows between terminals 18 and 20 is dependent upon both the intensity of the photon-stream (which in turn is proportional to the magnitude of the control current), and the externally applied base-emitter bias.

Figure 2:
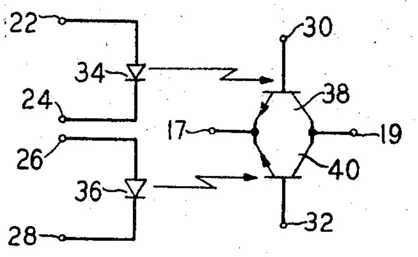
FIG. 2 depicts the connection of two of the devices of FIG. 1 as used in the first illustrative embodiment of the invention.

The device of FIG. 2 comprises two of the devices shown in FIG. 1. Diode 34 is optically coupled to photo-transistor 38 and diode 36 is optically coupled to photo-transistor 40. The current between terminals 17 and 19 is dependent upon the two control currents between terminals 22 and 24 and terminals 26 and 28, and the magnitudes of the potentials applied to the base terminals 30 and 32. If the intensity of one of the photon streams increases while the intensity of the other decreases by the same amount, one of the photo-transistors conducts more heavily while the other conducts less heavily; the total signal current between terminals 17 and 19 remains the same. If the intensities of both photon streams increase the signal current increases and vice versa. Similarly, the magnitude of the signal current is proportional to the potentials applied to base terminals 30 and 32.

Figure 3:
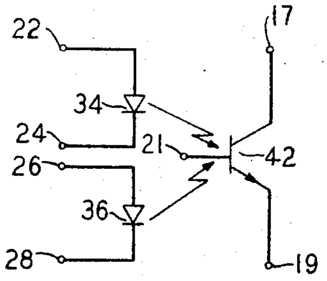
FIG. 3 is a second photon-coupled device which may be fabricated by known techniques and which is used in the second illustrative embodiment of the invention.

The device of FIG. 3 is similar to that of FIG. 2 except that both light-emitting diodes are optically coupled to the same photo-transistor 42. The signal current between terminals 17 and 19 is proportional to the intensities of both photon streams and the magnitude of the potential applied to base terminal 21.

Figure 4:
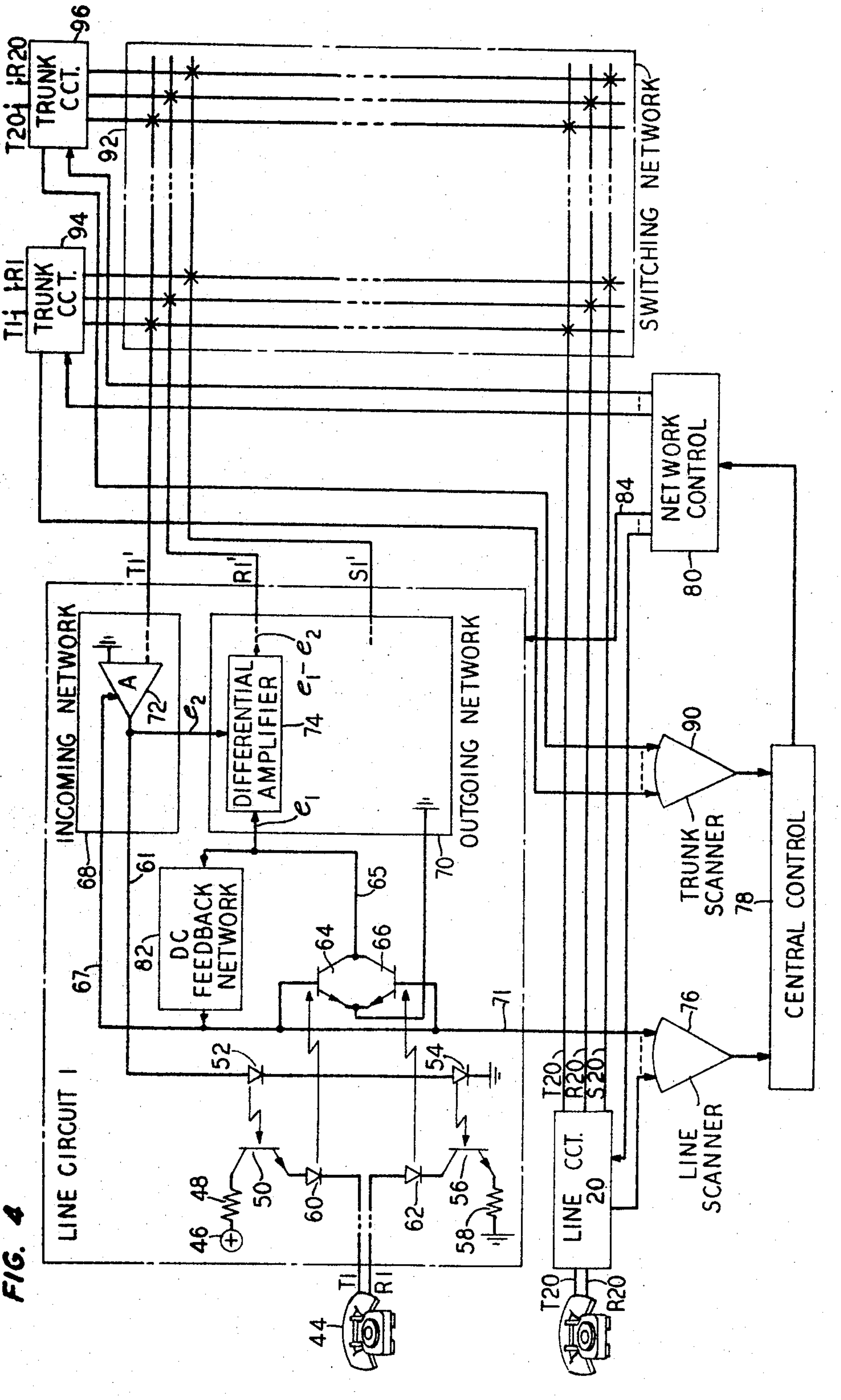
FIG. 4 is a first illustrative embodiment of the invention.

FIG. 4 is a first embodiment of the invention which shows the device of FIG. 2 incorporated in a two-wire line circuit. Various elements in line circuit 1 as well as various equipments in the over-all telephone system are shown in block diagram form only since these units are well known in the art. The system operates as follows: Switching network 92 includes 20 trunk groups of three conductors each and 20 horizontal groups of three conductors each. The trunk groups are extended to the trunk circuits such as 94 and 96. These trunk circuits are either interoffice or intraoffice trunks to enable the system to establish both types of calls. Each line circuit connects a respective subset such as 44 to the switching network.

The system operation is governed by central control 78. Line scanner 76 determines the supervisory status of the various lines and dial pulse information received from the respective subscribers and transmits this information to the central control. Similarly, trunk scanner 90 determines the supervisory status of the various trunk circuits and transmits this information to the central control. In accordance with information received by the central control, network control 80 transmits signals to the various line and trunk circuits to control their operations. Control signals transmitted over conductor 84, for example, control operations in line circuit 1. The switching network is of the end-marked type and in response to a particular signal received over conductor 84 a marking potential is applied to sleeve conductor S1' in line circuit 1. A similar marking operation is performed in the selected trunk circuit to control the selection of a crosspoint in the switching network. The details of the marking mechanisms in the line and trunk circuits are not shown since an understanding of the marking sequence is not necessary for an understanding of the present invention. An example of an end-marked switching network is disclosed in my copending application Ser. No. 495,156, filed Oct. 12, 1965.

Each line circuit includes additional units, not shown, which control operations an understanding of which is also unnecessary for an appreciation of my invention. For example, ringing current and busy and ringback tones may be applied directly to conductors T1 and R1 in line circuit 1 in response to the receipt of respective control signals over conductor 84. Similarly, tip and ring conductors T1 and R1 are shown dotted to indicate that additional units may be included in these paths in accordance with conventional telephone practice. The only elements shown within line circuit 1 are those necessary for an understanding of my invention.

Amplifier 72 in incoming network 68 supplies a quiescent current, even in the absence of incoming signals from the switching network, on conductor 61 for forward biasing light-emitting diodes 52 and 54. Each of these diodes is optically coupled to a respective one of photo-transistors 50 and 56. These transistors are not provided with base terminals since conduction through them is dependent solely on the intensities of the respective received photon streams. Although photons strike the base regions of the photo-transistors at all times current does not flow through the transistors until the subscriber at subset 44 goes off-hook. At this time current flows from source 46 through resistor 48, photo-transistor 50, light-emitting diode 60, tip conductor T1, the subset, ring conductor R1, light-emitting diode 62, photo-transistor 56 and resistor 58 to ground. Until the subscriber goes off-hook, no light is emitted by diodes 60 and 62. When the subscriber goes off-hook, however, these diodes emit photons which strike the base regions of respective photo-transistors 64 and 66.

The DC feedback network 82 is a stabiilzing circuit whose output, in the absence of any photons striking the base regions of photo-transistors 64 and 66, is maintained at a predetermined level. The output of DC feedback network 82 is fed directly to line scanner 76 to notify central control 78 of the on-hook status of the line. When the subscriber goes off-hook, however, the photon streams emitted by diodes 60 and 62 forward bias respective transistors 64 and 66. The potentials of conductors 65 and 71 thus change and are an indication that the subscriber is off-hook. The output of the DC feedback network when the line is off-hook is different from the output when it is on-hook, and since the output is connected directly to an input of line scanner 76 central control 78 is notified not only of service requests and hang-ups, but in addition can detect dial pulses since each dial pulse causes on-hook and off-hook transitions.

The DC feedback network operates on the input potential on conductor 65 and establishes an output potential which is dependent upon it. Since the output potential is applied to the base terminals of transistors 64 and 66, which transistors in turn control the input potential to the DC feedback network, it is seen that a DC feedback loop is included in the line circuit. The output of the DC feedback network is also applied via conductor 67 to the control terminal of amplifier 72. The quiescent current supplied by the amplifier to forward bias diodes 52 and 54 is thus adjusted by the output of the DC feedback network. This affects the intensities of the photon streams emitted by diodes 52 and 54, which in turn control the magnitude of the line current. The primary purpose of the DC feedback network is to control the operating point of photo-transistors 64 and 66 to be independent of line length and other variables. Signals are sent from the line circuit to the switching network through the photo-transistor pair and for proper operation the operating point of these transistors should be stabilized. The DC feedback network affects this stabilization in two ways. First, since the output of the feedback network is fed directly to the base terminals of the two transistors, the operating points can be controlled directly. Second, by causing amplifier 72 to adjust the bias current through diodes 52 and 54, the conduction of transistors 50 and 56 is affected. This in turn controls a change in the magnitude of the line current through diodes 60 and 62, which finally governs the conduction of transistors 64 and 66 by the optical coupling. The DC feedback network thus allows the same standard line circuit package to be used with lines of all lengths.

Signal currents from the switching network are received over tip conductor T1'. These signals are amplified by amplifier 72 and control a variation at the output of the amplifier. As the control current through the diodes 52 and 54 varies, the intensities of the photon streams emitted by these diodes follow. Since the photon streams are optically coupled to photo-transistors 50 and 56, it is seen that current in the line is directly dependent upon incoming signals on the tip conductor from the switching network. It should be noted that conduction in both photo-transistors 50 and 56 is determined by the same control current through the two associated diodes, and consequently these transistors aid each other in transmitting signals to the subscriber in accoradnce with operation of incoming network 68.

Signals to be sent to the switching network originate at subset 44. As the subscriber talks the line current varies and the current through diodes 60 and 62 varies. The two emitted photon streams follow the signal variations and in turn control the current through photo-transistors 64 and 66. Since any line current variation affects both diodes 60 and 62 in the same manner, transistors 64 and 66 both conduct more or less heavily together in response to any signal variation. The AC output of the two transistors ($e_1$) is applied to differential amplifier 74 in outgoing network 70. Neglecting the effect of the AC output of amplifier 72 ($e_2$) on the differential amplifier, the signal transmitted to the switching network over conductor R1' is thus seen to be dependent on signal variations originating in the line.

The arrangement of diodes 60 and 62 and photo-transistors 64 and 66 enables longitudinal noise to exert no control on the $e_1$ signal. Longitudinal noise results in a current flowing in the same direction in both of conductors T1 and R1. This has the effect of increasing the current through one of diodes 60 and 62 and decreasing the current through the other. Due to the optical coupling this in turn increases the current supplied by one of photo-transistors 64 and 66, and decreases the current supplied by the other to the differential amplifier. Since the photo-transistors are linear elements the net effect is that the total current supplied by both transistors does not change as a result of longitudinal currents. Consequently, longitudinal noise currents in the line do not result in the transmission of a signal to the switching network. (An alternate arrangement which also provides longitudinal noise cancellation is a series connection of photo-transistors 64 and 66.)

If the differential amplifier 74 is not included in outgoing network 70 "singing" may occur. Incoming signals on conductor T1', by modulating the current through diodes 52 and 54 affect the conduction of photo-transistors 50 and 56, which in turn controls variations in the line current. But since the line current passes through diodes 60 and 62 it is seen that the line current variations which arise from incoming signals can affect outgoing signals in the same manner as signals originating at the subset. This would result in singing, the return of incoming signals to the switching network over conductor R1'. For this reason the AC output of amplifier 72 is coupled to differential amplifier 74. The $e_1$ signal is dependent upon both the incoming signal received over conductor T1' ($e_2$) and the signal originating in the line. By subtracting the $e_2$ signal from the composite $e_1$ signal the output of the differential amplifier, $e_1—e_2$, is dependent solely upon signals originating at subset 44.

Figure 5:
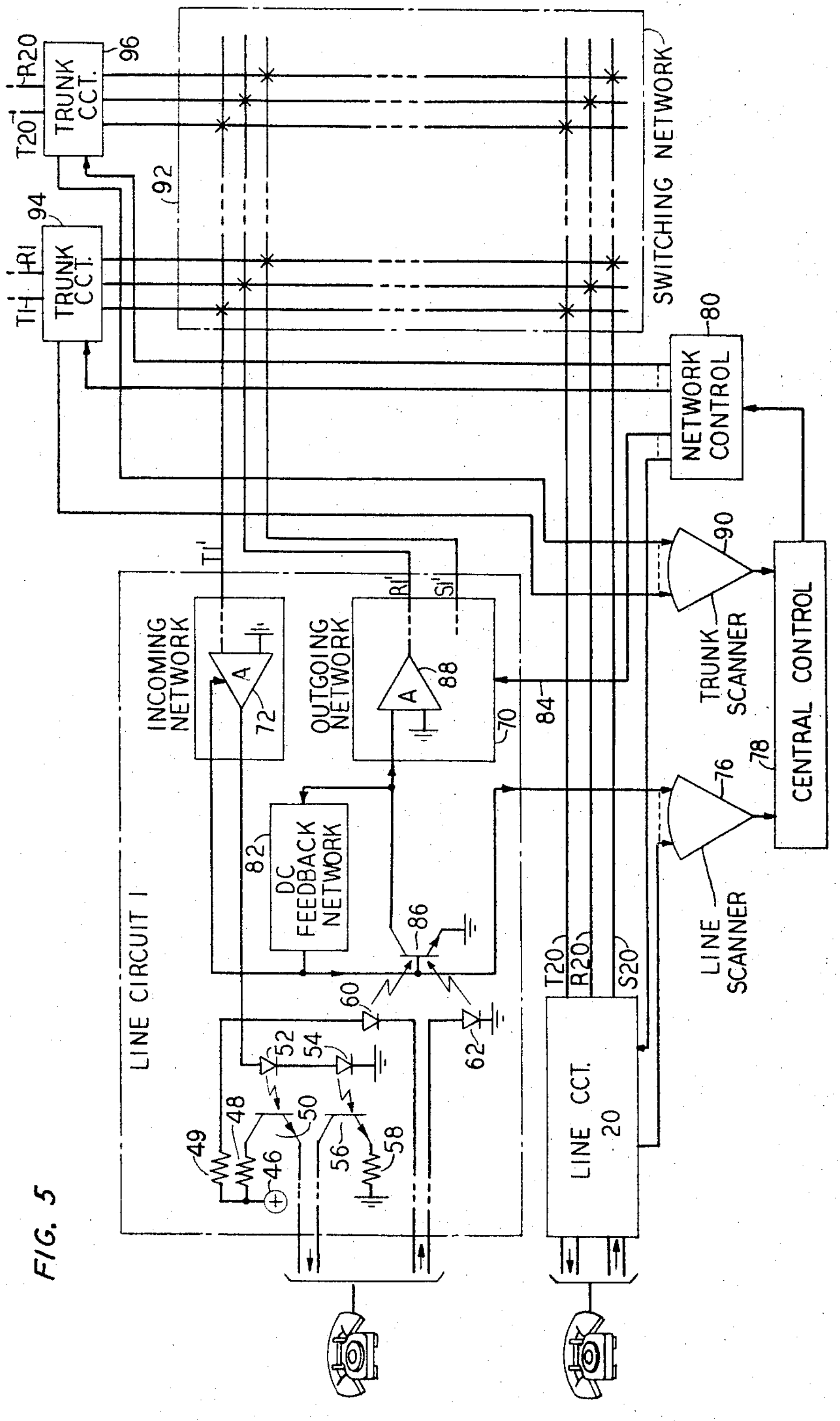
FIG. 5 is a second illustrative embodiment of the invention.

The system of FIG. 5 is similar to that of FIG. 4 but because the subscriber lines are four-wire rather than two-wire the differential amplifier is not required. Diodes 52 and 54 control the signals transmitted to the subset by varying the conduction of photo-transistors 50 and 56. However, diodes 60 and 62 are no longer in series with these two photo-transistors. Instead, these diodes are connected in series with resistor 49 to source 46, and signals received from the subset affect the current through these diodes while the conduction of transistors 50 and 56 no longer controls the current through the diodes. A single photo-transistor 86 is shown in line circuit 1 of FIG. 5 rather than the parallel arrangement used in FIG. 4. Since the light outputs of both of diodes 60 and 62 strike the base region of photo-transistor 86 it is seen again that longitudinal currents do not result in the transmission of a signal to the switching network. The intensity of the light emitted by one of the diodes increases while the intensity of the light emitted by the other decreases with the appearance of any longitudinal noise on the line, and the total intensity of the two photon streams remains unchanged. Since any signal derived from the subset affects the conduction in both diodes in the same manner the optical coupling is effective to transmit signals originating at the subset to the switching network. The major advantage of the line circuit shown in FIG. 5 over that shown in FIG. 4 is that current variations in diodes 60 and 62 are dependent only upon signals originating at the subset and are in no way a function of the conduction of photo-transistors 50 and 56, i.e., the signal received over conductor T1' from the switching network. Since the AC signal developed by transistor 86 is dependent only upon signals originating at the subset a differential amplifier is no longer required to extract an incoming signal component from the outgoing signal. For this reason outgoing network 70 on FIG. 5 includes an ordinary amplifier 88 rather than a differential amplifier.

Although the invention has been described with reference to two particular embodiments, it is to be understood that they are merely illustrative of the application of the principles of the invention. Numerous modifications may be made therein and other arrangements may be devised without departing from the spirit and scope of the invention.

What is claimed is:

1. A line circuit for connecting a two-wire subscriber line to a switching network comprising a first pair of light-emitting diodes connected in series with said line, a first pair of photo-transistors each optically coupled to one of the light-emitting diodes in said first pair for extending a signal current to said switching network in accordance with the signal current in said line, a second pair of light-emitting diodes connected to said switching network for receiving a signal current from said switching network, and a second pair of photo-transistors connected in series with said line each optically coupled to a respective one of the light-emitting diodes in said second pair for extending a signal current to said subscriber line in accordance with said signal current received from said switching network.

2. A line circuit in accordance with claim 1 further including differential amplifier means for subtracting from said signal current extended to said switching network a current component dependent upon said signal current received from said switching network.

3. A line circuit in accordance with claim 1 further including DC feedback network means for controlling a bias current to flow through said second pair of light-emitting diodes to stabilize the operating point of said first pair of photo-transistors.

4. A line circuit for connecting a four-wire subscriber line having transmit and receive conductor pairs to a switching network comprising a first pair of light-emitting diodes connected in series with said transmit pair, a photo-transistor optically coupled to said first pair of light-emitting diodes for extending a signal current to said switching network in accordance with the signal current appearing in said transmit pair, a second pair of light-emitting diodes connected to said switching network for receiving a signal current from said switching network, and a pair of photo-transistors connected in series with said receive pair each optically coupled to a respective one of the light-emitting diodes in said second pair for controlling a signal current in said receive pair in accordance with said signal current received from said switching network.

5. A line circuit in accordance with claim 4 further including DC feedback network means for controlling a bias current to flow through said second pair of light-emitting diodes to stabilize the operating point of said photo-transistor.

6. A line circuit for connecting a two-wire subscriber line to a switching network comprising a first photon-emitting device connected in series with said line, a first photon-responsive transistor device optically coupled to said first photon-emitting device for extending a signal current to said switching network in accordance with the signal current in said line, a second photon-emitting device connected to said switching network for receiving a signal current from said switching network, and a second photon-responsive transistor device connected in series with said line and said first photon-emitting device and optically coupled to said second photon-emitting device for extending a signal current to said subscriber line in accordance with said signal current received from said switching network.

7. A line circuit in accordance with claim 6 wherein said first photon-emitting device and said second photon-responsive transistor device each includes two semiconductor elements, with the two elements in each of the devices being connected to different ones of the two wires in said subscriber line, and further including means for supplying a bias current through said second photon-emitting device, and means for removing from said signal current extended to said switching network all components dependent upon said signal current received from said switching network.

8. A line circuit for connecting a four-wire subscriber line having transmit and receive conductor pairs to a switching network comprising a first photon-emitting device connected in series with said transmit pair, a first photon-responsive transistor device optically coupled to said first photon-emitting device for extending a signal current to said switching network in accordance with the signal current appearing in said transmit pair, a second photon-emitting device connected to said switching network for receiving a signal current from said switching network, and a second photon-responsive transistor device connected in series with said receive pair and optically coupled to said second photon-emitting device for controlling a signal current in said receive pair in accordance with said signal current received from said switching network.

9. A line circuit in accordance with claim 8 wherein said first photon-emitting device and said second photon-responsive transistor device each includes two elements, with the two elements in each of the devices being connected to different conductors in the respective transmit and receive pairs, and further including means for supplying a bias current through said second-photon-emitting device.

10. A line circuit for connecting a subscriber line to a switching network comprising a first photon-emitting device connected to said line, a first photon-responsive semiconductor device photon-coupled to said first photon-emitting device for extending a current to said switching network in accordance with the current in said line, a second photon-emitting device connected to said switching network for receiving a current from said switching network, and a second photon-responsive semiconductor device photon-coupled to said second photon-emitting device for extending a current to said subscriber line in accordance with said current received from said switching network.

11. A line circuit in accordance with claim 10 further including means responsive to the quiescent current flowing through said first photon-responsive semiconductor device for determining the supervisory state of said subscriber line.

References Cited

UNITED STATES PATENTS

| | | | |
|---|---|---|---|
| 3,129,289 | 4/1964 | Seeman. | |
| 3,230,315 | 1/1966 | Jody et al. | |
| 3,304,429 | 2/1967 | Bonin et al. | 307—311 |
| 3,315,176 | 4/1967 | Biard | 307—311 |
| 3,321,631 | 5/1967 | Biard et al. | 307—311 |

KATHLEEN H. CLAFFEY, *Primary Examiner.*

LAURENCE A. WRIGHT, *Assistant Examiner.*